United States Patent [19]
van Zijderveld et al.

[11] Patent Number: 5,425,443
[45] Date of Patent: Jun. 20, 1995

[54] CONVEYOR MAT BUILT UP OF SYNTHETIC MODULES AND MODULES FOR SUCH CONVEYOR MAT

[75] Inventors: G. J. van Zijderveld; A. J. L. Bos, both of 's-Gravenzande, Netherlands

[73] Assignee: MCC Nederland B.V., 's-Gravenzande, Netherlands

[21] Appl. No.: 285,395

[22] Filed: Aug. 3, 1994

[30] Foreign Application Priority Data

Aug. 3, 1993 [NL] Netherlands ............................ 9301335

[51] Int. Cl.$^6$ ............................................. B65G 23/06
[52] U.S. Cl. ........................................ 198/834; 198/853
[58] Field of Search .................. 198/850, 851, 853, 834

[56] References Cited

U.S. PATENT DOCUMENTS

| | | | |
|---|---|---|---|
| 4,993,544 | 2/1991 | Bailey et al. | 198/834 |
| 5,000,312 | 3/1991 | Damkjaer | 198/853 |
| 5,096,053 | 3/1992 | Hodlewsky | 198/853 |
| 5,123,524 | 6/1992 | Lapeyre | 198/853 X |
| 5,125,504 | 6/1992 | Corlett et al. | 198/853 X |
| 5,217,110 | 6/1993 | Spangler et al. | 198/853 X |

FOREIGN PATENT DOCUMENTS

0215983  4/1987  European Pat. Off. .

*Primary Examiner*—D. Glenn Dayoan
*Attorney, Agent, or Firm*—Varnum, Riddering, Schmidt & Howlett

[57] ABSTRACT

A conveyor mat built up of plastic intermediate modules and end modules, each module is made up of a plurality of equally spaced-apart hinge plates having hinge loops at the two ends thereof, the hinge plates of a module being coupled to each other by means of a rib asymmetrically located between the hinge loop openings which are located opposite each other, the ends of the hinge plates on a longitudinal side of a module being located between the ends of the hinge plates of a module adjacent in the longitudinal direction of the mat, the hinge loops of the two modules being coupled to each other by way of a hinge pin extending through the hinge loop openings. In operation, when the conveyor mat is driven in a first and second, opposite, direction, a sprocket wheel meshes with a side face of the rib and, respectively, the opposite hinge loop of a module. Through these measures, a conveyor mat is obtained whose modules can have an extremely slight length, up to 0.5".

16 Claims, 6 Drawing Sheets

CONVEYOR MAT BUILT UP OF SYNTHETIC MODULES AND MODULES FOR SUCH CONVEYOR MAT

BACKGROUND OF THE INVENTION

The invention relates to a conveyor mat built up of intermediate modules and end modules, made in one piece of synthetic material, the width of the intermediate modules being substantially twice the width of the end modules, with the modules, viewed in the longitudinal direction of the mat, being staggered, each module consisting of a plurality of substantially equally spaced-apart hinge plates, each extending over substantially the entire length of the module and each having hinge loops at the two ends thereof, the hinge plates of a module being coupled to each other by means of a rib located between the two ends, the ends of the hinge plates on a longitudinal side of a module being located between the ends of the hinge plates of a module adjacent in the longitudinal direction of the mat, the hinge loops of the two modules being substantially in alignment and coupled to each other by means of a hinge pin extending through the openings of the hinge loops, there being provided means for locking the hinge pin relative to the modules.

Such a conveyor mat, built up of modules, is disclosed in European Patent Document 380201 and is for instance used in the packaging industry, in bottling plants and the like, wherein the mat may have a relatively large width, up to some meters, and is designed as an endless conveyor mat, which at the beginning and the end of a conveying path is guided over sprocket wheels arranged across the width of the conveyor. The modules of which the mats are built up exist in various length dimensions; for instance, a length of 1 inch and of 2 inches is very conventional. For a module having a length of 1 inch, it has already been proposed in the above-mentioned European patent application to drive the module at the connecting rib of the hinge plates, for which purpose the teeth of the sprocket wheels are provided with a slot-shaped opening, in operation meshing with the rib on two sides. For particular applications, it is desirable that mats can be used whose modules have a length which is even slighter than that of the known modules, for instance a length of 0.5 inch. Such very short modules have the advantage that the modules at the end of the mat, where they are passed around a sprocket wheel, are only slightly inclined to raise from the plane of the mat due to the sprocket wheel meshing with the module, the so-called polygon effect. This polygon effect is disadvantageous, because it may cause the articles conveyed over the mat to fall down or at least obtain an unstable position. A further advantage of using very short modules is that the diameter of the sprocket wheels can be very small, which at the transition between two adjacent mats necessitates only a short "dead plate", the plate over which the articles are moved from one mat to the other. It is desired that a short dead plate has, in the conveying path, as few portions as possible that do not actively contribute to the conveyance.

To provide such modules of a slight length with sufficient strength, it is obvious that a minimal material thickness around the hinge loops, a minimal thickness of the rib and a minimal diameter of the hinge pin and hence of the hinge loops are required. It has been found that it is impossible to construct a module having such minimal material thicknesses and at the same time a length of, for instance, 0.5 inch in the same manner as the modules known from European Patent Document 380201, because the free space remaining between the rib of a module and the hinge loop located opposite thereto is too small for the drive tooth of a sprocket wheel to mesh therewith.

It is observed that a person skilled in the relevant field of expertise does not define the length of a module as the length of a single, separate module, but as the distance between the centers of the hinge pins which couple a module to adjacent modules. This is only logical, because for modules coupled with each other this distance determines the characteristics of the mat. In the case of oval hinge loops, this distance may slightly differ from the distance between the centers of the hinge loops of one module.

The object of the invention is to provide a chain mat whose modules are of such configuration that in spite of the very slight length of the modules it is still possible to move the chain mat forward and backward by means of a sprocket wheel.

SUMMARY OF THE INVENTION

To this end, the invention provides a chain mat of the above-mentioned type, characterized in that the rib of each of the modules is asymmetrically arranged relative to the openings of the hinge loops at the two ends of the hinge plates of that module, that between a side face of the rib and the free end face of a hinge loop of the adjacent module a space is present for receiving a tooth of a sprocket wheel, such that in operation the tooth of the sprocket wheel meshes with the side face of the rib of a module when the conveyor mat is driven in a first direction and with the opposite free end face of the hinge loop of the adjacent module when the conveyor mat is driven in a second, opposite direction.

SUMMARY OF THE INVENTION

Through these measures according to the invention, it has proved possible to realize a conveyor mat having the hitherto unachieved module length of only 0.5", so that the above-described advantages of a mat having such short modules are optimally exploited.

It is observed that European Patent Document 0215983 discloses a conveyor mat wherein the rib of each of the modules is asymmetrically arranged relative to the openings of the hinge loops at the two ends of the hinge plates of that module, the tooth of the sprocket wheel, in operation, when the conveyor mat is driven in a first direction, meshing with the side face of that rib. In this known mat, however, a second rib is arranged opposite the first rib such that the two ribs form an opening tapering off toward the top side of the mat for receiving the tooth of the sprocket wheel. Accordingly, when the known mat is driven in the second, opposite direction, drive takes place at this second rib. It is clear that the arrangement of two ribs between the hinge loops of the hinge plates of a module requires considerable space and cannot be combined with the object of the present invention to provide a module of a very slight length.

The invention also provides a locking member for locking the hinge pins at the lateral sides of the mat in the hinge loops, preventing these hinge pins from becoming detached from the mat. To this end, this locking member is characterized in that it is a substantially elongated, plate-shaped body with a hook-shaped projection arranged at each end thereof, each of the projections being capable of engaging with one of the two hinge loops in an outer hinge plate of an end module and of being removed therefrom. This feature permits a locking member to close the two openings for a hinge pin in an end module at the same time, while the locking member, despite the slight dimensions of the outer hinge plate of an end module, is still readily manageable without special tools and is also readily removable again.

Finally, the invention also relates to an end module and to an intermediate module evidently intended for use in the conveyor mat according to the invention.

BRIEF DESCRIPTION OF THE DRAWING

The invention will be explained in more detail hereinafter on the basis of an exemplary embodiment with reference to the accompanying drawings. In these drawings.

DETAILED DESCRIPTION

Figure 1A:
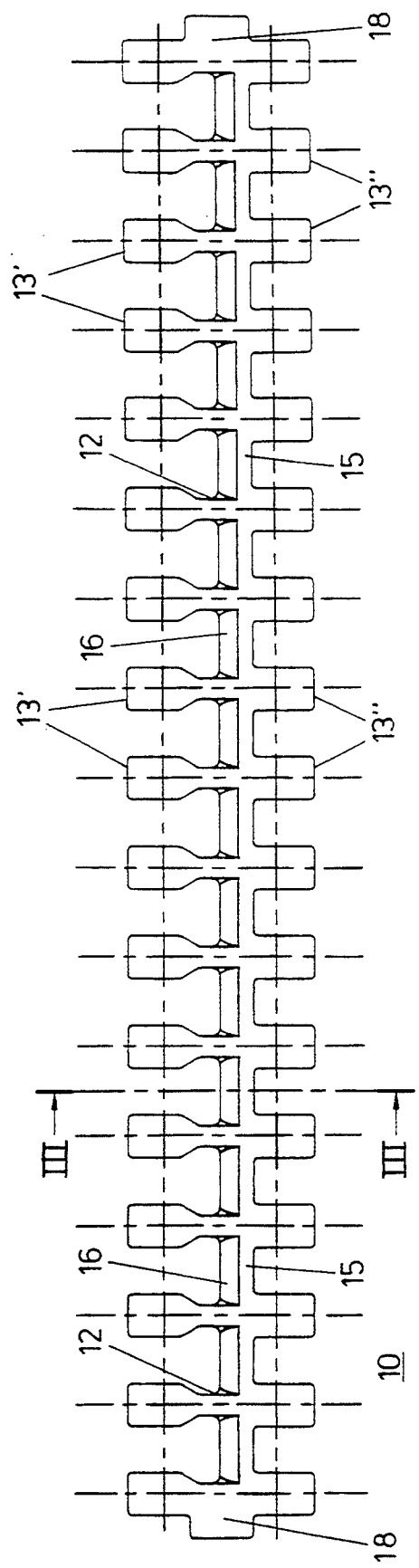
FIGS. 1a, b, c are a top plan view and two side elevations of an intermediate module for the conveyor mat according to the invention.
Figure 1B:
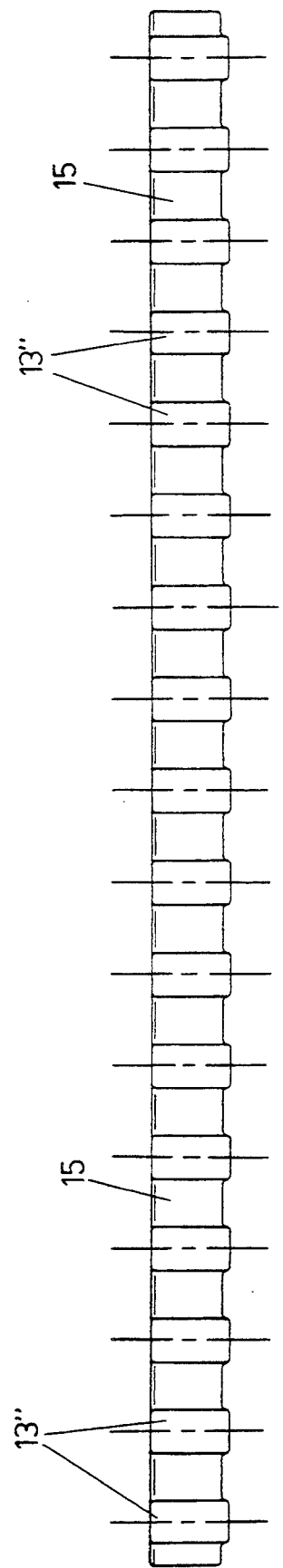
Figure 1C:
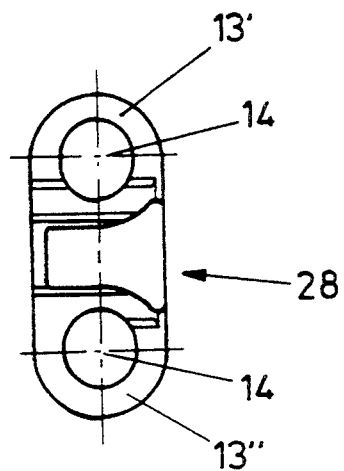
Figure 2A:
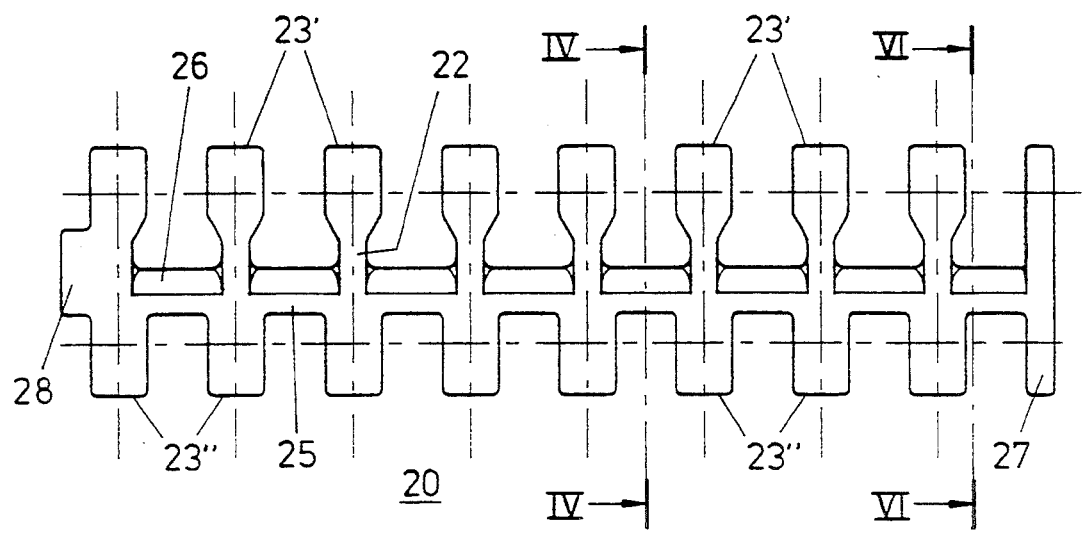
FIGS. 2a, b, c are a top plan view and two side elevations of an end module for the conveyor mat according to the invention.
Figure 2B:
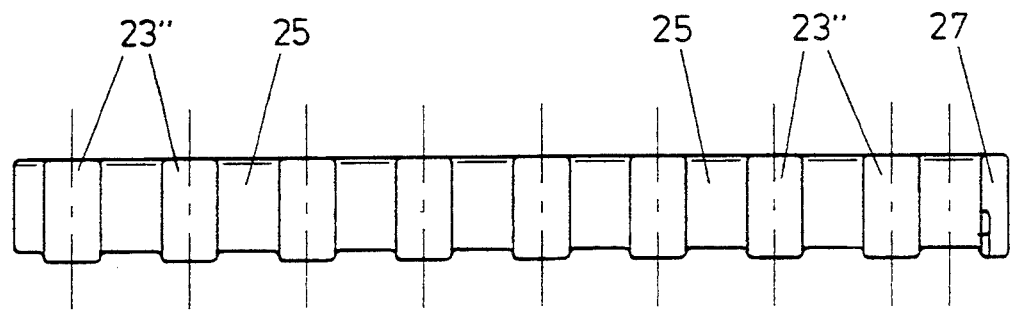
Figure 2C:
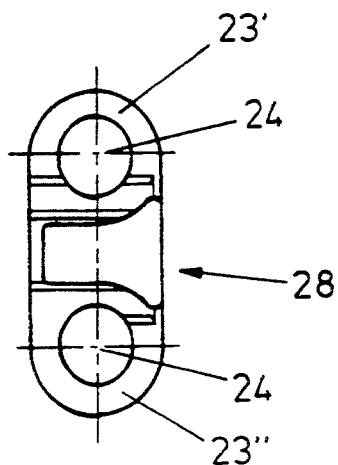

FIGS. 1 and 2 show an exemplary embodiment of an intermediate module and end module respectively for a conveyor mat according to the invention. The mat shown is of the so-called "flush grid" type. However, it is pointed out expressly that the advantages of the conveyor mat according to the invention will also be maintained if the mat is of the so-called "raised rib" or "flat top" type, wherein the modules of the mat are provided with upright plate-shaped members for supporting products to be conveyed, which plate-shaped members on the top side of the mat are always arranged on a hinge plate and lie in one plane therewith, or, respectively, with essentially entirely closed supporting surfaces, as the hinge plates on the top side of the mat are interconnected by a plate-shaped member which forms one whole with each module.

In FIGS. 1 and 2, similar parts are designated by the same reference numerals, however in FIG. 1 they are preceded by the number 1 and in FIG. 2 by the number 2. The intermediate and end modules, 10 and 20 respectively, are each of a one-piece construction and are manufactured by means of, for instance, injection molding. The modules each comprise a plurality of substantially identical hinge plates, 12 and 22, equally spaced apart and each hinge plate at the two ends on both sides of the body of the hinge plate having thickened hinge loops 13', 13" and 23', 23", wherein an opening 14 or 24 for a hinge pin is formed. The number of hinge plates of an intermediate module is approximately twice the number of hinge plates of an end module. Viewed in the width direction of the conveyor mat, the outer hinge plates 18 of an intermediate module are identical in shape and are also identical in shape with a first hinge plate 28 of the two outer hinge plates of an end module 20. The second outer hinge plate 27 of an end module is always located at the lateral edge of the conveyor mat and has a substantially flat outer side.

The hinge loops are configured such that all hinge loop openings of a module are in alignment. Also when the hinge plates of two modules, adjacent in the longitudinal direction of the mat, mesh with each other as the hinge plates of one module are always disposed between the hinge plates of the other module, the hinge loop openings of the two modules are in alignment. In this manner, the width of a module is determined by the number of hinge plates of which it consists, and the length of a module by the length of a hinge plate.

The hinge plates 12, 18 in an intermediate module and the hinge plates 22, 27, 28 in an end module are interconnected and kept equally spaced apart by a single transverse rib, 15 and 25 respectively, which rib is asymmetrically disposed between the hinge loop openings 14 and 24 respectively at the opposite ends of each hinge plate so as to create sufficient space between an upright side face of that rib, respectively 16 and 26 in FIGS. 1a, 2a and FIGS. 3, 4, and the opposite hinge loop 13' or 23', to allow the tooth of a sprocket wheel to mesh with the space between the rib and the loop. The side faces 16 and 26 of the ribs constitute a contact area for the sprocket wheels when they drive the mat in one direction. When the mat is driven in the opposite direction, the teeth of the sprocket wheels do not mesh with the rib 15 or 25, but with the thickenings around the hinge loop 13' or 23' of the corresponding module, which hinge loop is located opposite the contact area of the rib, and the hinge loops 13" or 23" of the module coupled therewith in the longitudinal direction of the mat. Thus, it has proved to be possible that modules having a length of only about 0.5" can also be driven in two opposite directions in a reliable manner. As the driving mechanism itself does not form a part of the invention and consists of components which are in itself conventional, it will not be further explained.

Figure 3:
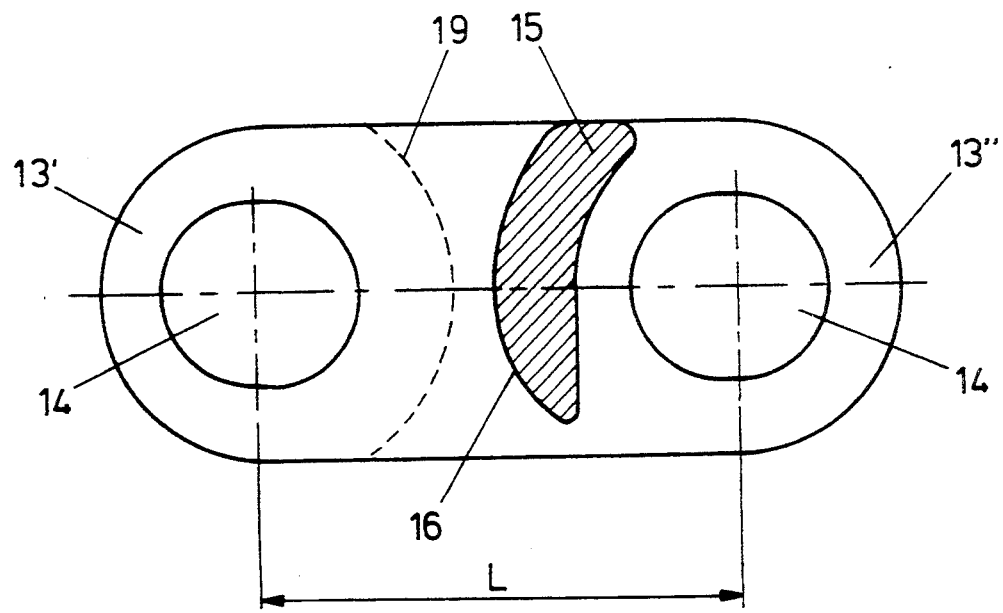
FIG. 3 shows a section taken on the line III—III in FIG. 1.
Figure 4:
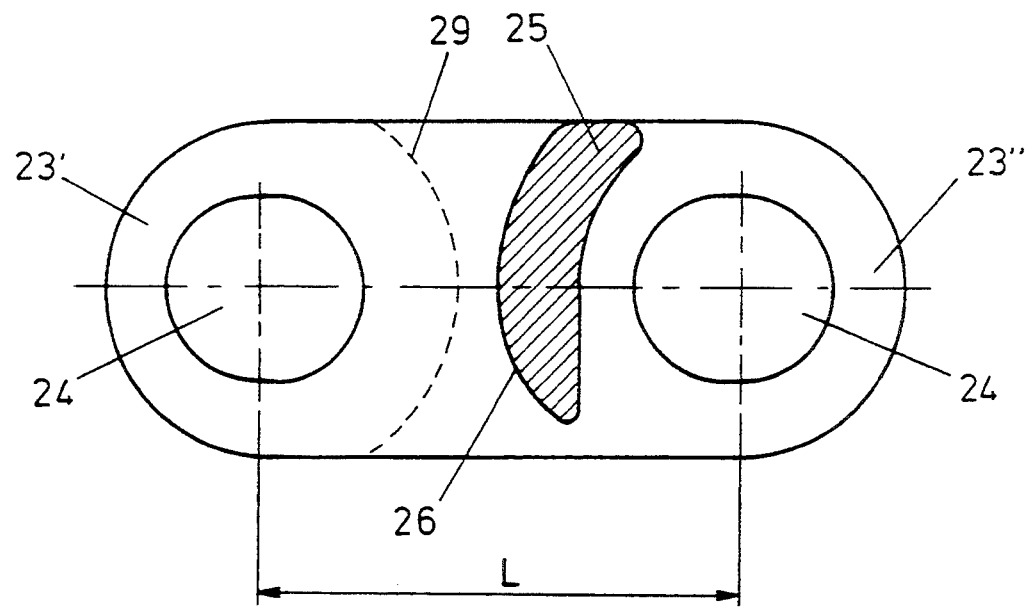
FIG. 4 shows a section taken on the line IV—IV in FIG. 2.

The sections shown in FIGS. 3 and 4 provide a further explanation of the construction of an intermediate module and an end module respectively. In these figures, the letter L designates the length of a module, which, in accordance with a preferred embodiment, is 0.5"=12.7 mm. Further, in these figures, a dotted line 19 and 29 respectively indicates the position of the free end face of the hinge loop 13' of an adjacent module, not further shown, capable of being coupled, in a manner known to a skilled person, to module 10 and 20 respectively, by means of a hinge pin. Thus, FIGS. 3 and 4 clearly show in which space, between the side face 16 and 26 respectively and the free end face of the adjacent hinge loop 19 and 29 respectively, the tooth of a sprocket wheel can mesh to drive the mat composed of modules 10 and 20 via the rib 15, respectively 25, or via the free end face 19, respectively 29.

Figure 5A:
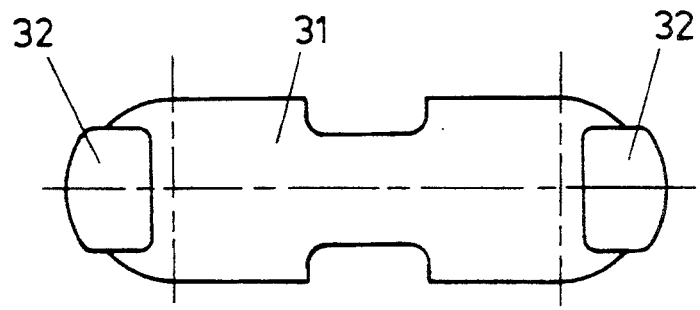
FIGS. 5a, b are a bottom view and a side elevation of a locking member according to the invention.
Figure 5B:
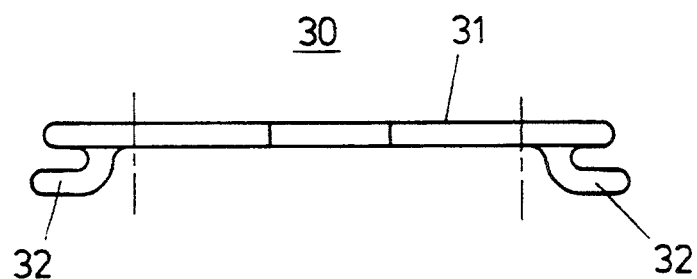

Without any problem, it will be understood by persons skilled in the art in which manner a conveyor mat can be built up from the intermediate modules and end modules, while it is observed that FIG. 2 only shows one type of end module, but that two types are employed in a mat, the only difference between these two types being that the second outer hinge plate 27, with which the locking member shown in FIG. 5 engages, is located at the right-hand side or left-hand side respectively of the end module.

Figure 6:
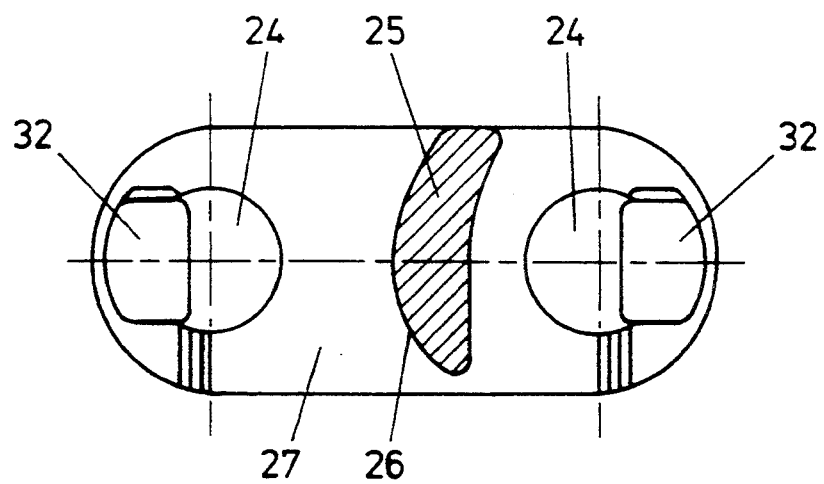
FIG. 6 shows a section taken on the line VI—VI in FIG. 2.

FIGS. 5a, b are a bottom and side elevation of the locking member 30 according to the invention, consisting of an elongated, plate-shaped body 31 having at its short ends two hook-shaped lips, each lip capable of cooperating with one of the two openings for the hinge pin in the outer hinge plate 27 of an end module, as shown in FIG. 6, which shows a section taken on the line VI—VI of FIG. 2. In this manner, in a conveyor mat built up of modules according to the invention, the hinge pins can reliably be prevented from becoming detached during operation, while moreover, the locking member remains readily manageable, despite the small dimensions of an end module, because it can close two openings 24 at the same time, which, in addition, is labor saving when a mat is being mounted.

We claim:

1. A conveyor mat built up of intermediate modules and end modules, made in one piece of synthetic material, the width of the intermediate modules being substantially twice the width of the end modules, with the modules, viewed in the longitudinal direction of the mat, being staggered, each module consisting of a plurality of substantially equally spaced-apart hinge plates, each extending over substantially the entire length of the module and each having hinge loops at the two ends thereof, the hinge plates of a module being coupled to each other by means of a rib located between the two ends, the ends of the hinge plates on a longitudinal side of a module being located between the ends of the hinge plates of a module adjacent in the longitudinal direction of the mat, the hinge loops of the two modules being substantially in alignment and coupled to each other by means of a hinge pin extending through the openings of the hinge loops; there being provided means for locking the hinge pin relative to the modules, characterized in that the rib of each of the modules is asymmetrically arranged relative to the openings of the hinge loops at the two ends of the hinge plates of said module, that between a side face of the rib and the free end face of a hinge loop of the adjacent module a space is present for receiving a tooth of a sprocket wheel, such that in operation the tooth of the sprocket wheel meshes with the side face of the rib of a module when the conveyor mat is driven in a first direction and with the opposite free end face of the hinge loop of the adjacent module when the conveyor mat is driven in a second, opposite direction.

2. A conveyor mat according to claim 1, characterized in that, viewed in the width direction of the conveyor mat, the outer hinge plates of an intermediate module are identical in shape with each other and also identical in shape with a first hinge plate of the two outer hinge plates of an end module and that the second outer hinge plate of an end module is always located at the lateral edge of the conveyor mat and has a substantially flat outer side.

3. A conveyor mat according to claim 1 characterized in that the rib has a thickness which decreases toward the bottom side of the module to form a contact area for a tooth of a sprocket wheel.

4. A conveyor mat according to claim 1, characterized in that connected to the top side of the mat, on each of the hinge plates is an upright plate-shaped member, lying in plane therewith.

5. A conveyor mat according to claim 1, characterized in that on the top side of the mat, the hinge plates are interconnected by a plate-shaped member which forms one piece with each module, to realize a conveyor mat having a closed top face.

6. A conveyor mat according to claim 5, characterized in that the rib has a thickness which decreases toward the bottom side of the module to form a contact area for a tooth of a sprocket wheel.

7. A locking member for use in a conveyor mat according to claim 1, and intended for locking the hinge pins at the lateral sides of the mat in the hinge loops, characterized in that the locking member is a substantially elongated, plate-shaped body with a hook-shaped projection arranged at each end thereof, each of the projections being capable of engaging with one of the two openings for the hinge pin in the second outer hinge plate of an end module and of being removed therefrom.

8. An intermediate module for a conveyor mat built up of intermediate modules and end modules, made in one piece of synthetic material, the width of the intermediate modules being substantially twice the width of the end modules, with the modules, viewed in the longitudinal direction of the mat, being staggered, each module consisting of a plurality of substantially equally spaced-apart hinge plates, each extending over substantially the entire length of the module and each having hinge loops at the two ends thereof, the hinge plates of a module being coupled to each other by means of a rib located between the two ends, the ends of the hinge plates at a longitudinal side of a module being located between the ends of the hinge plates of a module adjacent in the longitudinal direction of the mat, the hinge loops of the two modules being substantially in alignment and coupled to each other by means of a hinge pin extending through the openings of the hinge loops, there being provided means for locking the hinge pin relative to the modules, characterized in that the rib of each of the modules is asymmetrically arranged relative to the openings of the hinge loops at the two ends of the hinge plates of said module, that between a side face of the rib and the free end face of a hinge loop of the adjacent module a space is present for receiving a tooth of a sprocket wheel, such that in operation the tooth of the sprocket wheel meshes with the side face of the rib of a module when the conveyor mat is driven in a first direction and with the opposite free end face of the hinge loop of the adjacent module when the conveyor mat is driven in a second, opposite direction.

9. An end module for a conveyor mat built up of intermediate modules and end modules, made in one piece of synthetic material, the width of the intermediate modules being substantially twice the width of the end modules, with the modules, viewed in the longitudinal direction of the mat, being staggered, each module consisting of a plurality of substantially equally spaced-apart hinge plates, each extending over substantially the entire length of the module and each having hinge loops at the two ends thereof, the hinge plates of a module being coupled to each other by means of a rib located between the two ends, the ends of the hinge plates at a longitudinal side of a module being located between the ends of the hinge plates of a module adjacent in the longitudinal direction of the mat, the hinge loops of the two modules being substantially in alignment and coupled to each other by means of a hinge pin extending through the openings of the hinge loops, there being provided means for locking the hinge pin relative to the modules, characterized in that the rib of each of the modules is asymmetrically arranged relative to the openings of the hinge loops at the two ends of the hinge plates of said module, that between a side face of the rib and the free end face of a hinge loop of the adjacent module a space is present for receiving a tooth of a sprocket wheel, such that in operation the tooth of the sprocket wheel meshes with the side face of the rib of a module when the conveyor mat is driven in a first direction and with the opposite free end face of the hinge loop of the adjacent module when the conveyor mat is driven in a second, opposite direction.

10. A conveyor mat according to claim 1, characterized in that for the end modules and the intermediate modules, the distance between the centers of the hinge loops is approximately 0.5 inches.

11. A conveyor mat according to claim 2, characterized in that the rib has a thickness which decreases toward the bottom side of the module to form a contact area for a tooth of a sprocket wheel.

12. A conveyor mat according to claim 4, characterized in that the rib has a thickness which decreases toward the bottom side of the module to form a contact area for a tooth of a sprocket wheel.

13. A locking member for use in a conveyor mat according to claim 4, and intended for locking the hinge pins at the lateral sides of the mat in the hinge loops, characterized in that the locking member is a substantially elongated, plate-shaped body with a hook-shaped projection arranged at each end thereof, each of the projections being capable of engaging with one of the two openings for the hinge pin in the second outer hinge plate of an end module and of being removed therefrom.

14. A locking member for use in a conveyor mat according to claim 5, and intended for locking the hinge pins at the lateral sides of the mat in the hinge loops, characterized in that the locking member is a substantially elongated, plate-shaped body with a hook-shaped projection arranged at each end thereof, each of the projections being capable of engaging with one of the two openings for the hinge pin in the second outer hinge plate of an end module and of being removed therefrom.

15. A conveyor mat according to claim 4, characterized in that for the end modules and the intermediate modules, the distance between the centers of the hinge loops is approximately 0.5 inches.

16. A conveyor mat according to claim 5, characterized in that for the end modules and the intermediate modules, the distance between the centers of the hinge loops is approximately 0.5 inches.

* * * * *